3,345,353
METHOD OF CONTINUOUSLY RECOVERING PROTEIN FROM FATTY ANIMAL MATERIAL BY EMPLOYING DIRECTLY ADMIXED FAT AT A TEMPERATURE OF FROM 70° C.–120° C.
Ole Klubien, Copenhagen, Denmark, assignor to Thrige-Titan A/S, a company of Denmark
Filed Mar. 30, 1964, Ser. No. 355,783
Claims priority, application Denmark, Apr. 4, 1963, 1,574/63
5 Claims. (Cl. 260—112)

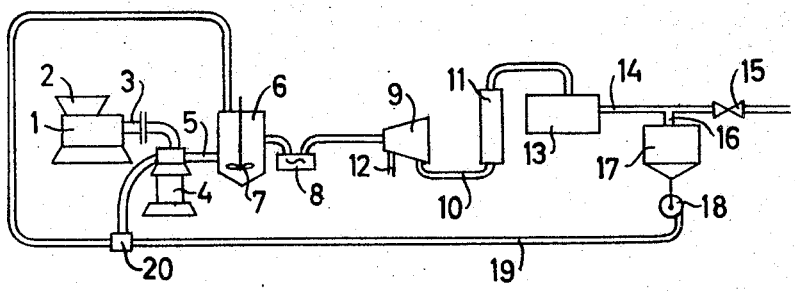

In the recovery of fat from animal raw material, e.g. animal carcasses, meat trimmings or slaughterhouse offal, by melting it is known to use either a high-temperature method by which the starting material is heated to the boiling point of water or over, or a low-temperature method by which the raw material is subjected to a less degree of heating for the purpose of completely or partly avoiding a coagulation of the protein in the starting material. Such a coagulation starts at a temperature of about 50° C. (120° F.), and the raw material therefore should not, at any rate not for any length of time, be heated above this temperature. On the other hand, the melting point of the animal fat may lie as high as about 40° C. (105° F.), and the raw material should therefore out of regard to the production be heated as closely as possible to beginning coagulation. It is known to perform this heating in a heat exchanger in the form of a vessel which is surrounded by a hot water jacket and may also comprise a heated stirring member. Usually, the raw material is supplied to this heat exchanger in a coarsely chopped state, e.g. with a maximum size of particles of 10–15 mm. (about ½"), and even if the heat exchanger may be operated continuously, i.e. under continuous advance of the coarsely chopped material from the inlet of the apparatus to its outlet, it is the general practice to heat the starting material in batches, e.g. batches of a couple of tons. In both cases care must be taken that the temperature of the heat exchanger surfaces, with which the raw material gets into contact, will not or at any rate only to an insignificant degree rise above the temperature at which the coagulation of the protein of the material is initiated. As furthermore there are rather narrow limits to the size of the heat exchange surface in relation to the quantity of raw material, the heating time must be comparatively long, e.g. 2–4 hours in the batch treatment of the raw material.

The principal purposes of this invention are to provide a method whereby the rendering can be effected without such long heating periods and in a continuous rather than a batch operation.

Thus, the invention relates to a method of continuously recovering protein by low-temperature melting of pork trimmings or other fatty animal material which after having been comminuted is heated to a temperature above the melting point of the fat by direct admixture of a medium heated to a temperature substantially exceeding said melting point, and the specific heat of which is lower than that of the raw material, and is next subjected to a separation, preferably in a centrifuge. The main characteristic feature of the invention is that the raw material chopped into fine particles of the size not exceeding a few millimetres, preferably not over 2–3 mm., within a period of a few seconds is intimately mixed with a heating medium of such quantity, dependent on the quantity of raw material and the temperatures and specific heat of the raw material and the heating medium, that the heating effect upon the raw material particles is kept below the value at which the raw material protein coagulates.

By the direct addition or admixture of the heating medium to the raw material a direct heat transmission to the latter is attained, and as the raw material is present in a finely choped state, this heat transmission will occur through an extremely large surface. This means that the heating of the raw material to the melting temperature desired can be effected in a very short time, even in the course of a few seconds, particularly when the temperature of the heating medium lies considerably above the melting temperature of the fat. According to the above explanation, this might seem inadmissible when the raw material should be kept below the coagulation point of the protein, but in practice it turns out that even with a heating medium temperature of up to or even above 100° C., no inadmissible coagulation damage to the raw material will take place. The reason for this must be that the heating, as already mentioned, may be of very short duration, and that the heating medium, as likewise mentioned above, has a lower specific heat than the raw material which will in fact have a rather considerable water content and thereby a comparatively high specific heat. This is combination with the intimate mixing of the raw material and the heating medium is of essential importance for the avoidance of local overheating of the raw material.

The heating medium may be fat derived from previously treated material and reheated. Also other substances may be contemplated as heating media, but by recirculation of fat produced in the process one avoids an admixture of foreign matter which may be undesirable in the final products. Furthermore, the fat has a comparatively low thermal conductivity which may also be important to avoid local superheating of the raw material. The heating medium may expediently be given a temperature of 70–120° C.

The full amount of heat necessary for the melting process may be supplied to the raw material in the way stated, but this supply of heat may, however, also be supplemented by a supply of heat in some other way, e.g. in a heated worm conveyor.

The invention furthermore comprises a plant for carrying out the method explained in the foregoing, said plant comprising one or more comminution devices which are connected to a centrifuge for separating off a substantial part of the fat content of the raw material from its protein. The characteristic feature of the plant according to the invention is that the oulet for separated-off fat from the centrifuge is connected to a heating apparatus, the outlet of which is connected to the plant upstream of the centrifuge. Such a plant will be capable of operating continuously and practically speaking without supervision for long periods, it being possible automatically to take care that fat in a suitable quantity and of a suitable temperature is led from the centrifuge back to the inlet end of the plant so that here a mixure temperature is attained which is close to but does not exceed the point at which the protein of the starting material is coagulated to an inadmissible extent.

In a preferred embodiment of the plant there is provided between the comminution means and the centrifuge a mixing and balancing container. This serves first and foremost as a storage container for the centrifuge for balancing variations, if any, in the supply of raw material to the comminution apparatus and thereby also in the output of material from this apparatus. In the mixing and balancing container there may, however, also occur a heating of the starting material, as the outlet from the heating apparatus may be connected to this container.

An embodiment of the plant according to the invention is shown diagrammatically in the drawing.

1 designates a coarse-chopper with a filling hopper 2 for receiving animal raw material which may be moderately pre-heated, but may if desired be cooled and possibly frozen. The outlet 3 of the coarse-chopper is connected to a fine-chopper 4 in which the material is comminuted to a size of particles of not over 2–3 mm. A conduit 5 connects the outlet of the fine-chopper 4 with a mixing and balancing container 6 which is shown provided with a stirring member 7 and which may expediently be heat-insulated or may be provided with a heating jacket. From this balancing container 6 the material is carried by means of a conveyor 8 to a centrifuge 9 in which the material, which is heated on its way to the centrifuge, is separated into a solid and a liquid phase. Through a conduit 10 the liquid phase, formed by fat and impurities, is led to a heating apparatus 11. 12 designates the outlet of the centrifuge for the solid phase of the starting material, the said phase being mainly composed of protein. In the apparatus 11 the fat separated off can be heated to a suitably high temperature, e.g. of 70–120° C. (160 to 250° F.), and this hot fat is passed on to a cleaning apparatus 13 in which water and other impurities can be separated off. The outlet from this apparatus is connected to an outlet pipe 14 with a control valve 15 and a branch 16 to a passage container 17 for heated fat. This passage container 17 is connected to the inlet of a pump 18 which through another conduit 19 can convey hot fat to the inlet end of the plant, i.e. before the centrifuge 9. The conduit 19, which comprises a control valve 20, may optionally be heat-insulated or heated so that the fat has a suitably high temperature, e.g. 70 to 120° C. (160 to 250° F.), when at the fine-chopper 4 or in the container 6 or in both places it is added to the raw material while being intimately mixed with the latter. Hereby the raw material is so to speak instantaneously heated to above the melting point of the fat without any danger being involved of the protein of the raw material coagulating to any perceptible extent.

For the sake of completeness should be mentioned that a plant like that illustrated can operate practically speaking fully automatically, but that the control equipment necessary in such case is for the sake of perspicuity not shown in the drawing.

SPECIFIC EXAMPLES

Example 1

Trimmings and back fat from hogs with an average fat content of 81 percent and with 19 percent of protein, water, etc. in a total amount of 300 kilos, were cut in a "Wäxiö 150SF" mincer having two cross knives and three hole plates, the last one of which has holes with a diameter of 5 mm. The minced material was delivered to a "K. Schnell" knife mill (K. S. Cutter), type KS–18, in which the material was further cut by a knife rotating with 3000 rev. per minute immediately above a plate with 3 mm. holes through which the material was forced.

The mass thus comminuted was delivered to a tank provided with a "Stamo" stirrer having four propellers rotating with a speed of 1450 rev. per minute. 470 kilos of soybean oil preheated to 102° C. (215° F.) was added within 1½ minutes and was so-to-speak immediately mixed with the comminuted raw material. The temperature of the mixture was 44° C. (111° F.).

While still at this temperature the mixture was pumped to a horizontal "Titan-Flottweg CMT-FZ1L" separator rotating with a speed of 5600 rev. per minute, in which a protein product with a fat content of 19 percent was separated from a liquid phase which in a subsequent operation, after having been heated to 98° C. (208° F.) was treated in a self-cleaning "Titan CNS–70" centrifuge operating with a speed of 6000 rev. per minute, in order to purify the mixture of oil and fat.

Example 2

An amount of 310 kilos raw material of the type specified in Example 1 was treated in analogous manner except that instead of the soybean oil an amount of 460 kilos of melted lard preheated to 99° C. (210° F.) was admixed. The final temperature of the mixture was 42° C. (108° F.).

A protein product with a fat content of 16 percent was obtained from the separator, and pure lard was derived from the liquid phase.

Example 3

Cuttings and trimmings from beef with an average fat content of 70 percent and with 30 protein, water etc. were comminuted and continuously fed to a tank as described in Example 1. Simultaneously with this feeding, a stream of melted beef fat at a temperature of 90° C. (194° F.) was also added to the tank in the proportion of 1 part of raw material to 1.5 parts of melted fat under vigorous stirring.

During the process the temperature of the mixture fluctuated between 40° C. and 45° C., the average being 42° C., and the feeding took in all 32 min.

After 15 minutes the bottom valve of the tank was opened and the pumping of the mixture to the horizontal separator started. The separating processes were just as described under Example 1 and a protein product with a fat content of 13 percent was obtained.

Example 4

Different cuttings from hogs with an average content of fat of 54 percent and with 46 percent protein, water etc. were comminuted and continuously delivered to a tank as described in Example 1. Simultaneously with this feeding, a stream of melted lard at a temperature of 80–84° C. (176 to 183° F.) was also added to the tank in the proportion of 1 part raw material to 2 parts of melted lard. The average temperature during the process was 41° C. (106° F.). After 10 minutes of processing the pumping to the horizontal separator was started and a protein product with a fat content of 17.5 percent was obtained.

The lard, after having been clarified in the self-cleaning separator, from which it was leaving with a temperature of 82–85° C. (180–185° F.), was used in the process to heat the raw material in the tank as described. The superfluous part of the melted fat was pumped from the installation for subsequent cooling and packing.

Example 5

Different cuttings from hogs mixed with abdominal fat with an average fat content of 65 percent and with 35 percent protein, water etc. were finely cut up as described in Example 1 and treated with melted lard at a temperature of 100° C. (212° F.) in the proportion of one part of raw material to 1.6 parts of melted lard. The melted lard, except for the first 7 minutes of the process, was obtained as described in Example 4 but was further heated with indirect steam to 100° C. (212° F.) before the mixing with the raw material.

Of the melted lard, 50 percent was added as before into the tank, while the remaining 50 percent was added to the minced material in the knife mill, just above the rotating knife.

The average temperature of the mixture in the tank under the process was 42° C. (108° F.). After 5 minutes of processing the pumping to the separator section was started and a protein product with a fat content of 12 percent was obtained.

Example 6

Different cuttings from hogs with an average fat content of 69 percent and with 31 percent protein, water, etc. were comminuted, and fed continuously to a tank as described in Example 1.

A continuous stream of melted lard at a temperature of 95° C. (203° F.) was added to the raw material in the knife mill just above the rotating knife. The average temperature during the process was 41° C. (106° F.) measured in the tank. After 2 minutes of processing the pumping to the separator section was started.

The melted lard used in the process was, except for the first 3 minutes, delivered from the self-cleaning separator, and heated to 95° C. (203° F.) as described in Example 5, before entering the knife mill.

The protein product obtained from the horizontal separator had a fat content of 12.5 percent.

In any of the examples described above a high quality protein product was obtained in which less than 10 percent had been damaged by coagulation.

I claim:

1. A method of continuously recovering protein and fat by low-temperature melting of animal fat containing material, comprising the steps of (1) comminuting said material to a particle size not substantially exceeding 3 mm.; (2) heating said comminuted material to a temperature above the melting point of the fat contents thereof by direct admixing fat at a temperature of about 70 to 120° C., and in such proportion and distribution that the average temperature of the mixture does not exceed the coagulation point of the protein contents of said animal material and is reached by all parts of the mixture within a period of few seconds; and (3) separating the liquid fat from the protein of the mixture.

2. A method as set forth in claim 1, wherein a portion of the separated fat is heated and recycled to the second step of the process.

3. A method as set forth in claim 1 wherein the liquid fat fraction is separated from the protein material by centrifuging.

4. A method as set forth in claim 1 wherein the animal fat containing material comprises pork trimmings and the average temperature of the mixture in step 2 is not over 44° C.

5. A method as set forth in claim 1 wherein the animal fat containing material comprises beef trimmings and the admixed melted fat is beef fat.

References Cited

UNITED STATES PATENTS 2,911,421  9/1959  Greenfield _____ 260—412.6

WILLIAM H. SHORT, *Primary Examiner.*

SAMUEL H. BELCH, *Examiner.*

H. SCHAIN, *Assistant Examiner.*